Feb. 5, 1946.   C. H. MANN   2,394,192
GARDENING DEVICE
Filed Aug. 17, 1944
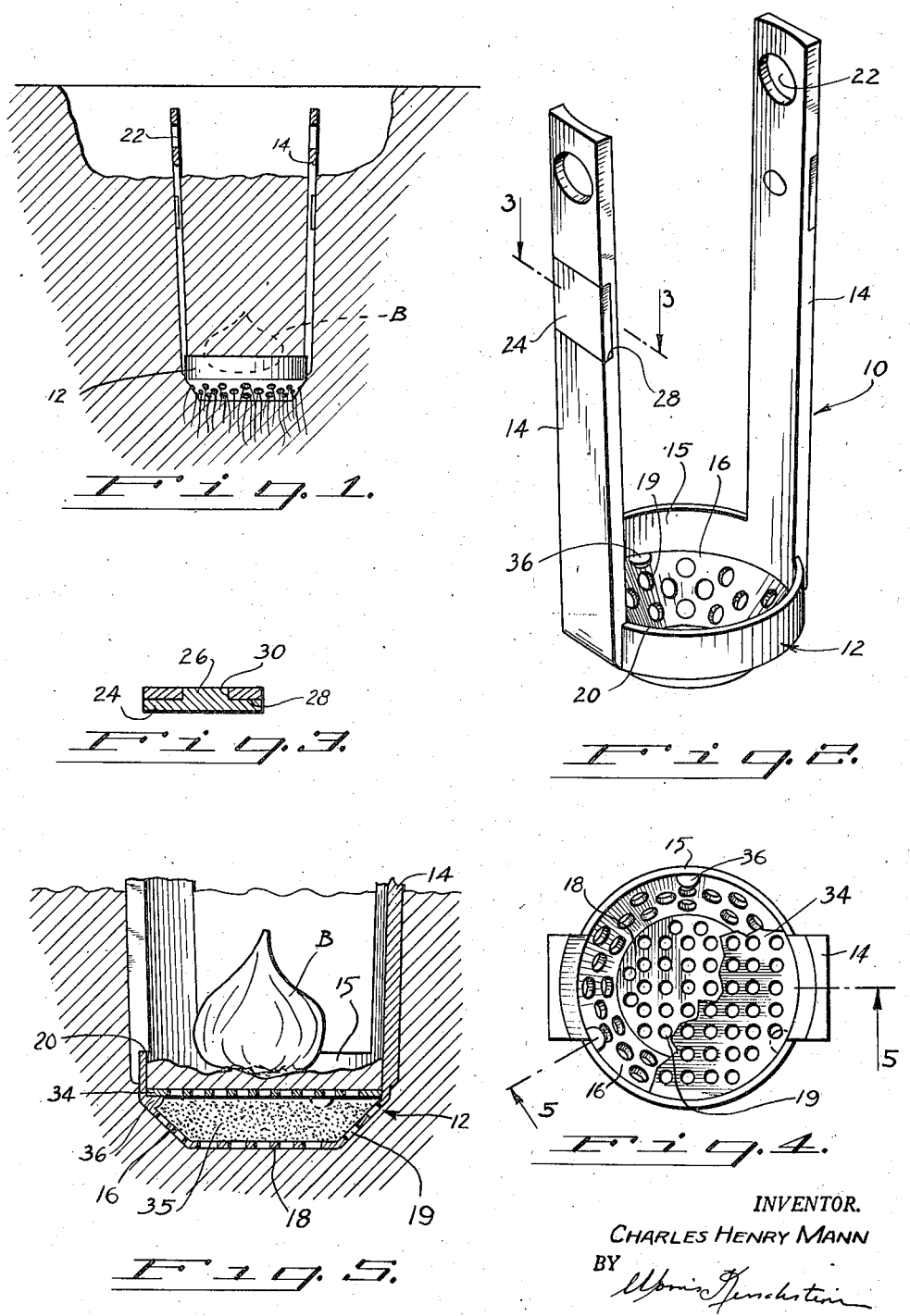
INVENTOR.
CHARLES HENRY MANN
BY
ATTORNEY.

Patented Feb. 5, 1946

2,394,192

UNITED STATES PATENT OFFICE 2,394,192

GARDENING DEVICE

Charles Henry Mann, Great Neck, N. Y.

Application August 17, 1944, Serial No. 549,850

3 Claims. (Cl. 47—37)

This invention relates to gardening devices. More particularly the invention is concerned with a device adapted to help the home gardener in planting, locating and removing bulbs.

One of the objects of the invention is to provide a gardening device of the character described with whose aid bulbs may be easily and properly planted to a uniform and predetermined depth.

Another object of the invention is to provide a gardening device which will serve as a permanent position marker for a bulb buried in the ground, so that the same can be readily located after the foliage has died down and the bulb is to be removed.

Another object of the invention is to provide a gardening device of the character described which will enable the buried bulb to be lifted out of the ground without extensive digging, thereby avoiding possible destruction of the bulb or of nearby plants.

Another object of the invention is to provide a gardening device of the character described which readily lends itself to identification of bulbs brought up out of the ground after the foliage has died down, so that these bulbs can be correctly classified before being placed in storage.

Another object of the invention is to provide a gardening device of the character described which can be used to promote vigorous growth of the plant through the placement of concentrated plant nutrients adjacent the bulb yet out of actual contact with the bulb and soil.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which is shown one of the various possible embodiments of this invention, Fig. 1 is a partially sectional view showing the gardening device embodying my invention as it appears during removal of a bulb from the ground;

Fig. 2 is a perspective view of said device with the false bottom removed;

Fig. 3 is a sectional view taken substantially along the line 3—3 of Fig. 2;

Fig. 4 is a top plan view of the device; and

Fig. 5 is a sectional view taken substantially along the line 5—5 of Fig. 4 and showing the device used to keep concentrated plant nutrients near a bulb.

As is well known, there are many perennial plants which grow from bulbs and corms, and which all will be referred herein by the generic term "bulbs." The bulbs are buried in the earth, left there during the growing and flowering period, and after all foliage his withered and disappeared, they are dug up and stored indoors for replanting a subsequent season.

However, much difficulty has been experienced in the various phases of bulb handling, for example, a home gardener finds it difficult to plant all bulbs of like nature to a uniform, proper predetermined depth, without a great deal of measuring. In addition, when he drops a bulb into a hole the bulb often tips or lays on its side rather than resting flat on its base. He also finds it difficult to locate the bulb after the foliage has died down and disappeared. In addition, when the bulb is dug up, the home gardener often destroys the bulb or nearby plants. Sometimes, particularly when the bulb is dug up a good while after the foliage has disappeared, the home gardener incorrectly identifies the bulb; that is, he may identify the bulb as being of a proper species, as for example, a gladiolus corm or a tulip bulb, but he will be unable to recall what the color of the gladiolus or tulip bloom was. Nevertheless, when replanting it is often highly desirable to know what color flower will grow from each bulb, in order to have a certain pattern of colors in a flower bed.

In accordance with the present invention, I provide a very simple and inexpensive gardening device which can be used without elaborate ceremony to plant, locate and remove a bulb in such manner as to avoid all the foregoing difficulties.

In general, a gardening device embodying my invention is characterized by the provision of a perforate bulb holding receptacle, having rigidly secured thereto at least one upright which performs the triple function of serving as a depth gauge, a position marker, and extraction handle for pulling up buried bulbs contained in the receptacle.

Referring now in detail to the drawing, 10 denotes a gardening device embodying my invention. Said device, as noted above, comprises a perforate receptacle 12 and a pair of uprights 14 rigidly secured in any suitable fashion to the receptacle.

The receptacle may be of any desired form and dimensions best suited to accommodate the bulb with which it is to be used. The receptacle may include an imperforate collar 15 from which there integrally depends a downwardly tapering frustro-conical perforate wall 16 whose bottom end is closed off by a perforate base wall 18. The perforations 19 in the side and base walls are sufficiently large to enable the roots of the bulb with which the receptacle 12 is to be used to freely pass therethrough without constraint or restriction.

The function of the base 18 and slanting side walls 16 is to support a bulb B on a perforate surface through the apertures 19 of which the roots of the bulb can pass during growth and through which apertures plant nutriment may be derived from the surrounding soil. The apertures also have a drainage function preventing water from accumulating in the receptacle around the bulb. The imperforate collar 15 serves to protect the bulb B from inadvertent damage due, for example, to stones which might be forced against the bulb accidentally when earth is being placed around the bulb or tamped down into the hole in which the bulb is located. If desired, said collar also may be perforated to facilitate drainage and access of water to the bulb. However, this is not necessary since the collar is disposed laterally of the bulb and its prime purpose is protection.

If desired, both the collar, side walls and base may be of other configurations. Thus, the collar 15 can be curved inwardly to shield the bulb partially from vertical pressure as well as lateral pressure; and the side and base walls 16, 18 can be shaped to provide a deeper receptacle or be curved in elevation for esthetic purposes.

In general, however, for a reason which will later be apparent, I prefer to have the side walls 16 taper downwardly and inwardly, in either a straight or curved line, from a zone of maximum diameter above which the diameter of the receptacle does not decrease. In the instant case, the conical walls 16 provide the tapering portion and the collar 15 the portion of uniform diameter above said conical side walls.

The receptacle is made from a rigid material which will not rot or corrode over a period of years when buried in soil, regardless of constitution thereof. For this purpose, I prefer to employ a synthetic resin, for example, a phenolic condensate, a methacrylic polymer, or any of the other well known resins, or stainless steel or an equivalent non-corrodible metal, e. g., sheet steel which has been rust-proofed by any known process.

The uprights 14 are rigidly secured to the receptacle 12. Their attachment may be effected by rivets, mechanical interlocks, nuts and bolts, adhesion, or integral attachment, such as welding, or by having the uprights and receptacle cast or molded as a single piece or made from a single piece of flat stock. It will be understood that by the term "welding," as used above, I include either metal welding, in the event that the receptacle and uprights are of metal, or plastic welding, which is carried out under heat alone or heat and pressure, in the event that the uprights and receptacle are synthetic resins, such as thermoplastics. In the present case, I have illustrated the uprights as being formed unitarily with the receptacle, the same all being molded in one piece from a synthetic resin.

Said uprights are preferably so connected to the receptacle as to leave the mouth 20 thereof free, as will be seen from an inspection of Figs. 2 and 5; that is, no portion of the uprights, particularly near the receptacle mouth, overhangs said mouth. The uprights extend upwardly roughly perpendicular to the planes of the receptacle base 18 and mouth 20, and in general, parallel to the axis of symmetry of said receptacle. To facilitate packing and storage of the device, it is desirable to make the uprights straight and to have them diverge slightly from each other. This allows them to be nestably stacked. The transverse sectional contour of the uprights is of no particular importance, except that it should be of sufficient cross-section to make the uprights sturdy.

The uprights preferably are provided near their upper ends with through holes 22 or an equivalent lifting means to afford a hold for a mechanical aid when the gardening device is pulled out of the ground.

Either the uprights or the receptacle may be provided with some identifying means which enables any specific device, and the bulb contained therein, to be distinguished from other devices of the same general construction and dimensions. In the present case, I have shown the identifying means as comprising a disc 24 of plastic material having a boss 26 on its rear face. The disc is received in a shallow indentation 28 in an upright 14, which indentation negatively matches the external configuration of the disc. The boss 26 is received in an aperture 30 in said upright in the base of the indentation 28.

A plurality of discs 24 may be furnished, each having a different characteristic color, colored patterns or printing on its outer face, to enable the user of the gardening device readily to identify both the type of bulb and the color of the bloom after the bulb has been pulled up.

The discs may be held in place in any suitable manner. For example, the boss 26 may be press-fitted into the aperture 30, and attachment may be assisted by placing a cementitious compound in the identation 28. When both the disc and upright are of plastic, I may employ acetone to soften the same and facilitate adhesion. If the disc and upright are of thermoplastic materials, they can be used together under heat and pressure on the premises of a garden device supplier at the time the devices are sold.

To use the device in planting a bulb, I may place a small amount of rich soil, or the like, in the receptacle 12 and then set or press the bulb B on top of the soil. It will be noted that because the bulb is being placed on an exposed mound of soil, it is a comparatively simple matter to put it in its proper erect position setting flat on its base. Either before or after the bulb is placed in the receptacle, a hole of large enough diameter and approximately the proper depth is dug in the ground at the location the bulb B is desired to occupy. The device is then inserted in the hole, receptacle first, and the position of the top of the uprights noted relative to ground level.

The distance between the top of the uprights and the base 18 will be known, the same either being marked on the device or ascertained by measurement of a typical device. This distance is used to facilitate burying the bulb to the proper depth in the ground. For example, if the tips of the uprights are seven inches above the base and it is desired to bury the bulb seven inches, then when the receptacle rests on the bottom of the hole in the ground, the tips of the uprights should be just at ground level. If the bulbs are supposed to be buried six and one-half inches, then approximately one-half inch of the uprights should protrude above ground level. It will be apparent that these small distances may be readily estimated and made uniform during the planting of a plurality of bulbs, in contrast with distances of a greater order, like seven inches, down to the bottom of a hole in the ground.

It may be noted at this time that it is usually desirable to employ gardening devices 10 in which the uprights 14 are deliberately selected, so that their tips will not extend above ground level when the bulb is planted, the same being intended to be approximately one-quarter to one-half inch below ground level.

Returning now to the insertion of the receptacle into the hole, if when the receptacle is bottomed in the hole, the tips of the uprights are not in proper position relative to ground level, the hole either is filled in or dug out further to remedy this condition, until the tips of the uprights are in proper predetermined position relative to ground level.

Next, the hole is filled up with dirt and the same tamped in to the proper degree, as is well known in the horticultural field.

After the bulb has flowered, and the foliage has died and withered away, the bulb must be pulled up out of the earth. The first thing to do is to find the bulb. If the bulb has been buried so that the tips of the uprights protrude above ground level, the position of the bulb will, of course, be immediately ascertainable. However, even if the tips of the uprights are slightly below ground level, said uprights will nevertheless serve as a position marker. To find the bulbs in this case, it is merely necessary to scratch along the surface of the ground in the general vicinity where the bulb was known to be until the tips of the uprights are encountered. Then dirt is removed around and between the apertures 22 or equivalent lifting means, as shown in Fig. 1. Now, a stick or the like is inserted through the two apertures, and, with its aid, a gentle twisting and pulling force applied to said device until the device is worked free and uprooted. The bulb can then be removed from the receptacle and stored until it is desired to plant the same again.

It is often desirable to have a local source of concentrated plant nutrients for promoting plant growth disposed adjacent the bulb and protected from the surrounding earth, and my gardening device is specially designed to facilitate such placement of plant nutrients. It is for this reason that the side walls 16 of the receptacle taper inwardly and downwardly. At the point where said side walls merge with the collar 15, I may dispose a false perforated bottom 34. The plant nutrients 35 are placed in the space between the false bottom and base 18, the bulb B being set on soil on the false bottom.

It may also be desirable to afford a better support for the false bottom 34 and to this end I provide adjacent the top edge of the side walls 16 a plurality of nibs 36 which may be integrally formed with said side walls. It should be pointed out that these nibs themselves can serve as the sole support for the false bottom and the slope of the side walls eliminated.

It will thus be seen that there is provided a device and method for using the same which achieve the several objects of this invention, and which are well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A gardening device of the character described for supporting a bulb in the ground, said device including a squat, rigid, bulb holding receptacle adapted to be completely buried in the soil, said receptacle having base and side walls and an open top, and several through holes in said said and base walls large enough to pass freely and without restriction the roots extending from said bulb during growth thereof, to drain water from the receptacle, and to pass plant nutrient to the bulb from surrounding soil, a false bottom, means to support said false bottom in said receptacle, said false bottom having several through holes large enough to pass freely and without constriction the roots extending from the bulb during growth, the space between the false bottom and the base wall of the receptacle being adapted to receive plant nutrients, and a combined depth gauge, position marker and extraction handle comprising a pair of straight elongated uprights rigidly secured to diametrically opposite portions of said receptacle and extending upwardly substantially perpendicular to the mouth thereof.

2. A gardening device of the character described for supporting a bulb in the ground, said device including a squat, rigid, bulb holding receptacle adapted to be completely buried in the soil, said receptacle having base and side walls, and an open top, and several through holes in said side and base walls large enough to pass freely and without constriction the roots extending from said bulb during growth thereof, to drain water from the receptacle, and to pass plant nutrient to the bulb from surrounding soil, said side walls including a collar and a pendent, downwardly tapering, conical frustrum, the frustrum being perforate and the collar imperforate, and a combined depth gauge, position marker and extraction handle comprising a pair of straight elongated uprights rigidly secured to diametrically opposite portions of said receptacle and extending upwardly substantially perpendicular to the mouth thereof.

3. A gardening device of the character described for supporting a bulb in the ground, said device including a squat, rigid, bulb holding receptacle adapted to be completely buried in the soil, said receptacle having base and side walls and an open top, and several through holes in said side and base walls large enough to pass freely and without constriction the roots extending from said bulb during growth thereof, to drain water from the receptacle, and to pass plant nutrient to the bulb from surrounding soil, said receptacle having at least three coplanar interior nibs lying in a plane approximately parallel to the mouth thereof and adapted to support a perforate false bottom, the space between the false bottom and the base wall of the receptacle being adapted to receive plant nutrients, and a combined depth gauge, position marker and extraction handle comprising a pair of straight elongated uprights rigidly secured to diametrically opposite portions of said receptacle and extending upwardly substantially perpendicular to the mouth thereof.

CHARLES HENRY MANN.